US00RE44946E

(19) United States
(12) Reissued Patent
Shiohara et al.

(10) Patent Number: US RE44,946 E
(45) Date of Reissued Patent: Jun. 17, 2014

(54) SHEET FEEDING DEVICES AND IMAGE RECORDING APPARATUS INCLUDING THE SAME

(71) Applicants: Yukio Shiohara, Nagoya (JP); Yuji Koga, Nagoya (JP)

(72) Inventors: Yukio Shiohara, Nagoya (JP); Yuji Koga, Nagoya (JP)

(73) Assignee: Brother Kogyo Kabushiki Kaisha, Nagoya-shi, Aichi-ken (JP)

(21) Appl. No.: 13/660,937

(22) Filed: Oct. 25, 2012

Related U.S. Patent Documents

Reissue of:
(64) Patent No.: 7,819,394
Issued: Oct. 26, 2010
Appl. No.: 12/363,539
Filed: Jan. 30, 2009

(30) Foreign Application Priority Data

Jan. 31, 2008 (JP) ..... 2008-020608

(51) Int. Cl.
*B65H 3/44* (2006.01)
*B65H 5/26* (2006.01)

(52) U.S. Cl.
USPC ..... 271/9.12; 271/9.13; 271/9.11

(58) Field of Classification Search
USPC ..... 271/9.11, 9.12, 9.13
See application file for complete search history.

(56) References Cited

U.S. PATENT DOCUMENTS

| | | | | |
|---|---|---|---|---|
| 5,052,670 | A * | 10/1991 | Makiura et al. | 271/9.13 |
| 6,829,453 | B2 * | 12/2004 | Kouzu | 399/124 |
| 6,973,279 | B2 * | 12/2005 | Yokoi | 399/124 |
| 7,831,173 | B2 * | 11/2010 | Kusukawa et al. | 399/114 |
| 7,865,110 | B2 * | 1/2011 | Yamazaki | 399/110 |
| 7,917,057 | B2 * | 3/2011 | Koyanagi et al. | 399/110 |
| 2006/0076729 | A1 * | 4/2006 | Kozaki et al. | 271/9.11 |
| 2009/0142098 | A1 * | 6/2009 | Shin et al. | 399/124 |

FOREIGN PATENT DOCUMENTS

JP 2006-064727 A 3/2006

* cited by examiner

*Primary Examiner* — Ernesto Suarez
(74) *Attorney, Agent, or Firm* — Baker Botts L.L.P.

(57) ABSTRACT

A sheet feeding device having a first sheet feeding path and a second sheet feeding path through which a sheet is configured to be fed. A first sheet-guiding member is disposed between the first sheet feeding path and the second sheet feeding path. The first sheet-guiding member is configured to move between a first position and a second position. A second sheet-guiding member is disposed opposite the first sheet feeding path. The second sheet-guiding member is configured to move between a third position and a fourth position. A connecting member is configured to selectively couple the first sheet-guiding member to the second sheet-guiding member.

22 Claims, 8 Drawing Sheets

SHEET FEEDING DEVICES AND IMAGE RECORDING APPARATUS INCLUDING THE SAME

Matter enclosed in heavy brackets [ ] appears in the original patent but forms no part of this reissue specification; matter printed in italics indicates the additions made by reissue.

CROSS-REFERENCE TO RELATED APPLICATION

This application *is a reissue application of U.S. Pat. No. 7,819,394 B2, which is issued from U.S. patent application Ser. No. 12/363,539 and which* claims the benefit of Japanese Patent Application No. 2008-020608, filed Jan. 31, 2008, the [disclosure] *disclosures* of which [is] *are* incorporated herein by reference.

BACKGROUND OF THE INVENTION

1. Field of the Invention

The present invention generally relates to a sheet feeding device that has a sheet feeding path. In particular, the invention relates to mechanisms for opening sheet feeding paths in a sheet feeding device.

2. Description of the Related Art

A known image recording apparatus, e.g., a printer, a copier, and the like, is provided with a sheet feeding device that feeds a plurality of sheets of recording medium, e.g., paper. The plurality of recording mediums are set in a sheet-feeding cassette and fed to a recording position at which an image is recorded on each of the recording medium. An example of such an image recording apparatus is described in Japanese Unexamined Patent Application Publication No. 2006-64727.

The known image forming apparatus, e.g., the one described in Japanese Unexamined Patent Application Publication No. 2006-64727, has a two-sided unit mounted thereon. The two-sided unit has a switchback carrying path and a paper re-feeding path. The two-sided unit is disposed on the main body of the image forming apparatus. The two-sided unit can be turned in a unit-opening direction. A paper-carrying path is formed at a space between the main body of the image forming apparatus and the two-sided unit. A sub-rotating unit is disposed at the inner-surface side of the two-sided unit. The sub-rotating unit can rotate. The paper re-feeding path is formed between the two-sided unit and the sub-rotating unit. The sub-rotating unit is urged to open the paper re-feeding path. When the two-sided unit opens the paper-carrying path, the sub-rotating unit simultaneously opens the paper re-feeding path. Thus, it is possible for a user to remove a jammed sheet of recording paper from either the paper-carrying path or the paper re-feeding path.

Nevertheless, the mechanism described in the known sheet feeding apparatus can not be adopted in a sheet feeding device with a dual path configuration. A dual path configuration has a first sheet feeding path and a second sheet feeding path with a sheet-guiding member disposed therebetween. The first sheet feeding path and the second sheet feeding path do not simultaneously feed sheets of recording mediums. In order to open both of the first sheet feeding path and the second sheet feeding path, it is necessary to detach the sheet-guiding member from the first sheet feeding path and the second sheet feeding path. If both of the first sheet feeding path and the second sheet feeding path are opened when a sheet of recording medium is jammed in the second sheet feeding path, the sheet-guiding member collides with the sheet of recording medium that is jammed in the second sheet feeding path, and thereby causes damage to the jammed sheet of recording medium.

Moreover, when no recording paper is present in the second sheet feeding path, it is preferable to open the first sheet feeding path and the second sheet feeding path at the same time. However, in a sheet feeding device with each of the first sheet feeding path and the second sheet feeding path opened independently, it is practically impossible to remove a sheet of recording paper that is jammed on the inner first sheet feeding path unless a user opens both the outer second sheet feeding path and the inner first sheet feeding path. If a user is not aware of the existence of a plurality of paper feeding paths, the user may have difficulty finding the paper which is jammed on the inner first paper feeding path even though the user has opened the outer second paper feeding path. Without removing the jammed paper, the attempt to restart paper feeding results in a failure because the sheet of recording paper remains jammed in the first paper feeding path.

SUMMARY OF THE INVENTION

An advantage of an embodiment of the invention is to provide a sheet feeding device that has sheet feeding paths which allow for a user to easily open the sheet feeding paths in which a sheet of recording medium is jammed.

According to an embodiment of the invention, a sheet feeding device comprises a first sheet feeding path and a second sheet feeding path through which a sheet is configured to be fed. A first sheet-guiding member is disposed between the first sheet feeding path and the second sheet feeding path. The first sheet-guiding member is configured to move between a first position and a second position. When the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side. A second sheet-guiding member is disposed opposite the first sheet feeding path. The second sheet-guiding member is configured to move between a third position and a fourth position. When the second sheet-guiding member is in the third position, the second sheet-guiding member guides the sheet along the second sheet feeding path, and when the second sheet-guiding member is in the fourth position, the second sheet-guiding member is separated from the second sheet feeding path. A connecting member is configured to selectively couple the first sheet-guiding member to the second sheet-guiding member.

According to another embodiment of the invention, an image recording apparatus comprises a sheet feeding device. The sheet feeding device comprises a first sheet feeding path and a second sheet feeding path through which a sheet is configured to be fed. A first sheet-guiding member is disposed between the first sheet feeding path and the second sheet feeding path. The first sheet-guiding member is configured to move between a first position and a second position. When the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side. A second sheet-guiding member is disposed opposite the first sheet feeding path. The second sheet-guiding member is configured to move between a third position and a fourth position. When the second sheet-guiding member is in the third position, the second sheet-guiding member guides the sheet along the second sheet feeding path, and when the second sheet-guiding member is in the fourth position, the second sheet-guiding member is separated from the second sheet feeding path. A connecting member is configured to selectively couple the first sheet-guiding member to the second sheet-guiding member.

Other objects, features, and advantages of embodiments of the present invention will be apparent to persons of ordinary skill in the art from the following description of preferred embodiments with reference to the accompanying drawings.

DETAILED DESCRIPTION OF EMBODIMENTS OF THE INVENTION

Figure 1:
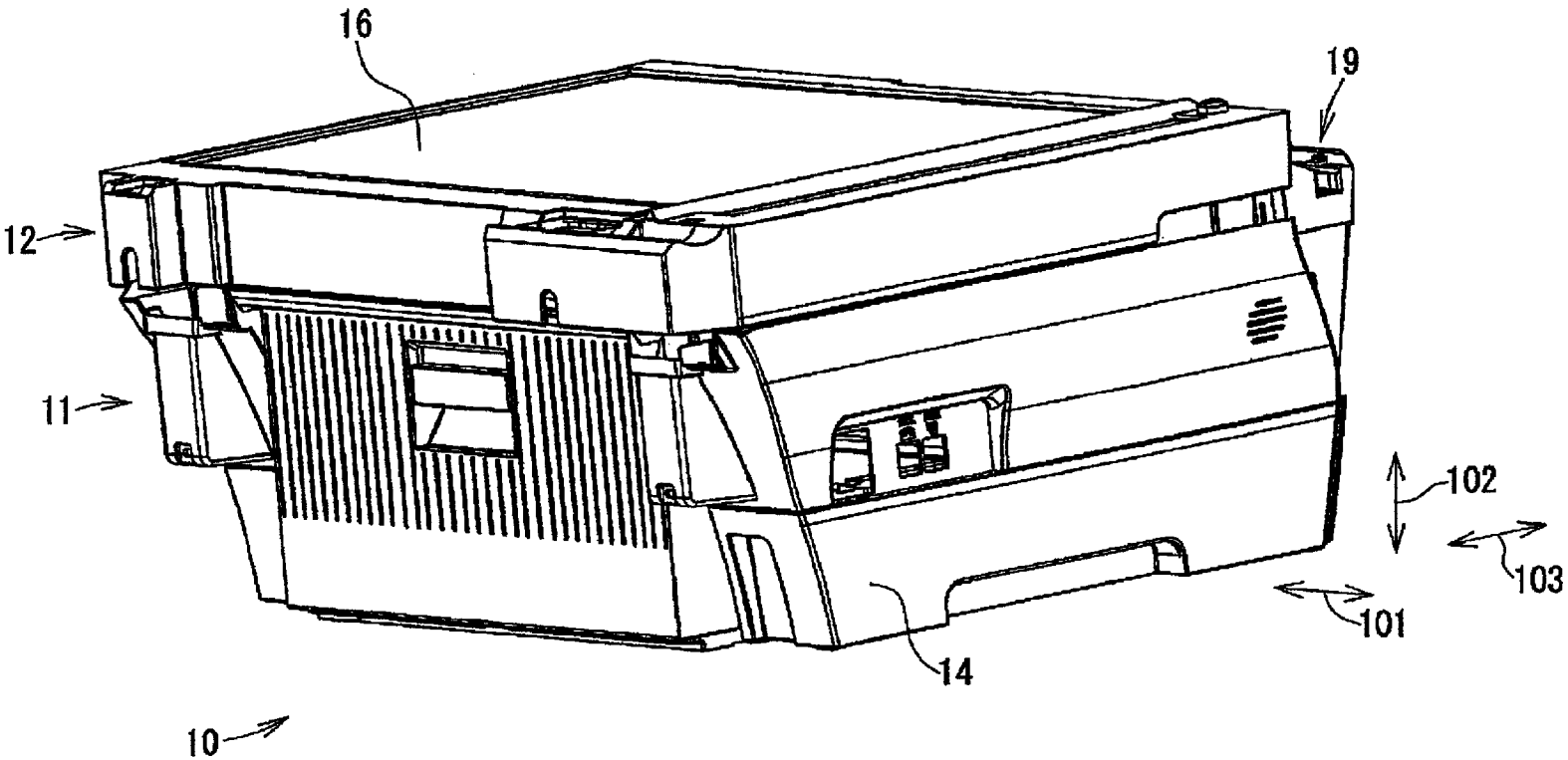
FIG. 1 is a rear perspective view of a multi-function machine according to an embodiment of the invention.

Embodiments of the present invention and their features and technical advantages may be understood by referring to FIGS. 1-8B, like reference numerals being used for like corresponding portions in the various drawings.

Figure 2:
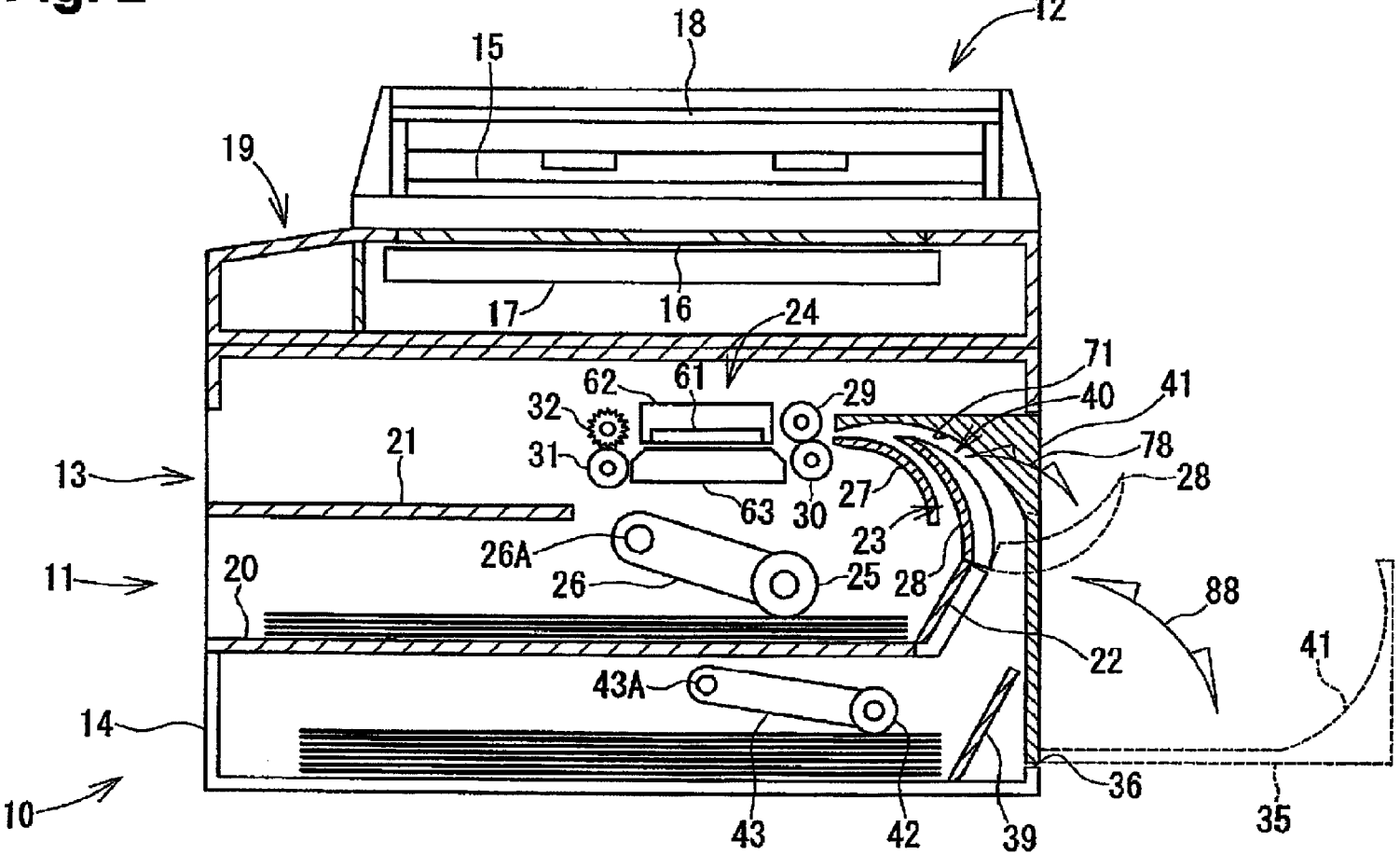
FIG. 2 is a cross-sectional view of the multi-function machine.

Referring to FIGS. 1 and 2, a multi-function machine 10 according to an embodiment of the invention may comprise a printer unit 11 and a scanner unit 12 which form an integrated multi-function device ("MFD"). Printer unit 11 may be disposed at a lower portion of the MFD. Scanner unit 12 may be disposed at a upper portion of the MFD. Multi-function machine 10 may perform one or more of a printing function, a scanning function, a copying function, and a facsimile function.

Printer unit 11 may be connected to an external information equipment, e.g., a computer or the like. According to information, e.g., image data or document data, received from the external information equipment, printer unit 11 may print an image, text information, and the like on a sheet of recording medium, e.g., printing paper or resin paper.

The exterior of multi-function machine 10 may have a substantially rectangular parallelepiped shape, which has widths and depths that may be greater than its heights. As shown in FIG. 1, a double-headed arrow 102 may indicate a height direction, a double-headed arrow 101 may indicate a width direction, and a double-headed arrow 103 may indicate a depth direction. As shown in FIG. 2, a front opening 13 may be disposed at the front portion of printer unit 11. A paper-feeding tray 20 may be disposed inside the front opening 13. A paper ejection tray 21 may be disposed over paper-feeding tray 20 inside front opening 13. Sheets of recording medium may be set on paper-feeding tray 20. The sizes of recording medium which may be set on paper-feeding tray 20 may comprise a variety of regular sheet sizes, e.g., A3, A4, B5, and postcard size. The recording medium set on paper-feeding tray 20 may be fed to an image recording part of printer unit 11 at which a desired image may be recorded on the recording medium. The recorded medium may then be ejected to paper ejection tray 21.

A paper-feeding cassette 14 may be disposed below opening 13. Sheets of recording medium with various sizes, e.g., legal size, A4 size, B5 size, may be set on paper-feeding cassette 14. The number of recording mediums which are set on paper-feeding cassette 14 may be several times, e.g., approximately ten times, greater than the number of recording mediums which are set on paper-feeding tray 20. Therefore, a more frequently used size of recording medium, e.g., A4 paper, may be set on paper-feeding cassette 14.

Scanner unit 12 may be a flatbed scanner. As shown in FIG. 2, an original document cover 15 may be disposed on the upper surface of multi-function machine 10 and may be opened and closed freely. When original document cover 15 is opened, a platen glass 16 may become accessible. An image sensor 17 may be disposed under platen glass 16. Image sensor 17 may move under platen glass 16 to perform image scanning on a sheet of original document placed on platen glass 16. An automatic document feeder ("ADF") 18 may be disposed in original document cover 15. ADF 18 may automatically feed a sheet of original document.

A user operation panel 19 may be disposed at the upper front part of multi-function machine 10. User operation panel 19 may comprise a plurality of manual operation buttons and a liquid crystal display unit. The manual operation buttons may comprise, for example, a power button for turning the power of multi-function machine 10 ON/OFF, a start button for starting image reading operation or image recording operation, a stop button for stopping the operation, a mode button for setting a copy mode, a scan mode, a facsimile mode, ten keys for inputting various setting conditions e.g., image reading conditions or image recording conditions and inputting a facsimile number. Multi-function machine 10 may operate in accordance with operation instructions given through user operation panel 19. If multi-function machine 10 is connected to an external computer, multi-function machine 10 may operate according to instructions received from the external computer via a printer driver or a scanner driver.

Referring to FIG. 2, an inclined paper separation plate 22 may be disposed at a downstream end of paper-feeding tray 20 in a sheet feeding direction. Inclined paper separation plate 22 may separate an uppermost sheet of recording mediums from the other sheets of recording medium placed in paper-feeding tray 20. Inclined paper separation plate 22 may separate the recording mediums placed in paper feeding tray 20 one at a time. As such, inclined paper separation plate 22 selectively may guide the uppermost sheet of recording mediums upward in a successive manner. A first paper-feeding roller 25 may be disposed over paper-feeding tray 20. First paper-feeding roller 25 may feed recording mediums set in paper-feeding tray 20 toward inclined paper separation plate 22. First paper-feeding roller 25 may be disposed at the front end of a first arm 26. First arm 26 may support first paper-feeding roller 25 in a rotatable manner. Driving power outputted from an automatic sheet-feeding ("ASF") motor (not shown) may be communicated to first paper-feeding roller 25 via a driving force communication mechanism. The motor power communication mechanism may comprise a plurality of gears which engage one another. First paper-feeding roller 25 may rotate according to the motor power received from the driving force communication mechanism.

First arm 26 may be pivotably attached to a supporting shaft 26A. Accordingly, first arm 26 may pivot downward to contact the inner bottom surface of paper-feeding tray 20. In addition, first arm 26 may pivot up and away from paper-feeding tray 20. An urging member, e.g., a mechanical spring or the like, may apply a downward urging force to first arm 26 such that first arm 26 is urged toward paper-feeding tray 20. Alternatively, first arm 26 may be urged toward paper-feeding tray 20 due to the weight of first arm 26. When paper-feeding tray 20 is being inserted into printer unit 11 or being removed from printer unit 11, first arm 26 may be retracted upward away from paper-feeding tray 20. With first arm 26 being urged downward, first paper-feeding roller 25 may be in contact with the uppermost sheet of recording medium set in paper-feeding tray 20. With first paper-feeding roller 25 being in contact with the uppermost sheet of recording paper, first paper-feeding roller 25 may rotate and feed the uppermost sheet of recording medium to inclined paper separation plate 22 because of a frictional force between the surface of first paper-feeding roller 25 and the surface of the uppermost sheet of recording medium.

A first paper feeding path 23 may be formed inside printer unit 11. First paper feeding path 23 may extend from inclined paper separation plate 22 in an upward direction. First paper feeding path 23 may comprise a portion that curves downstream from inclined paper separation plate 22 in the sheet-feeding direction. The curved portion may curve toward the front of multi-function machine 10. First paper feeding path 23 may guide a recording medium to paper ejection tray 21 through an image-recording unit 24, which is disposed downstream from the curved portion in the sheet-feeding direction. A sheet of recording medium fed from paper-feeding tray 20 may travel in first paper feeding path 23 upward and may turn around at the curved portion. The sheet of recording medium which is guided along the curved portion may reach image-recording unit 24. At image-recording unit 24, image recording may be performed on the sheet of recording medium. The sheet of recording medium may then be ejected to paper ejection tray 21.

First paper feeding path 23 may comprise a pair of paper-guiding surfaces which are formed opposite to each other with a predetermined clearance therebetween. As illustrated in FIG. 2, according to an embodiment of the invention, the curved portion of first paper feeding path 23 may comprise an inner paper-guiding member 27 and a first paper-guiding member 28. Inner paper-guiding member 27 may be disposed at an inner side, e.g., left and lower side of first paper feeding path 23, as shown in FIG. 2. First paper-guiding member 28 may be disposed at an outer side, e.g., right side of first paper feeding path 23, as shown in FIG. 2. First paper-guiding member 28 may comprise an inner surface and an outer surface opposite the inner surface. The inner surface of first paper-guiding member 28 may face toward the inside of multi-function machine 10 and the outer surface of first paper-guiding member 28 may face toward the outside of multi-function machine 10. The inner surface of first paper-guiding member 28 may form the outer paper-guiding surface of first paper feeding path 23. The outer surface of first paper-guiding member 28 may form the inner paper-guiding surface of second paper feeding path 40. Accordingly, a sheet of recording paper fed in first paper feeding path 23 or in second paper feeding path 40 may be guided in the sheet feeding direction by first paper-guiding member 28.

First paper-guiding member 28 may be disposed between first paper feeding path 23 and second paper feeding path 40. First paper-guiding member 28 may function as a divider between first paper feeding path 23 and second paper feeding path 40. First paper-guiding member 28 may be pivotably supported on a frame of multi-function machine 10. First paper-guiding member 28 may pivot between a first position and a second position. When first paper-guiding member 28 is in the first position, first paper feeding path 23 may be closed and first paper-guiding member 28 may guide a sheet of recording medium along first paper feeding path 23 or second paper feeding path 40 in the sheet feeding direction. The first position of first paper-guiding member 28 is indicated with solid lines, as shown in FIG. 2. When first paper-guiding member 28 is in the second position, first paper feeding path 23 may be opened. The second position of first paper-guiding member 28 is indicated with broken lines, as shown in FIG. 2. As shown in FIG. 6, first paper-guiding member 28 may comprise a turn shaft 87 at its lower end. First paper-guiding member 28 may be pivotally attached to the frame of multi-function machine 10 at turn shaft 87. First paper-guiding member 28 may pivot about turn shaft 87 in a direction indicated by a double-headed arrow 78, as shown in FIG. 2.

Image-recording unit 24 may be disposed downstream from the curved portion of first paper feeding path 23 in the sheet-feeding direction. Image-recording unit 24 may be disposed adjacent to a carriage 62 on which a recording head 61 is mounted. Carriage 62 may move in a forward direction and a reverse direction alternately for performing recording on a recording medium. Ink-supplying units, e.g., ink cartridges, may be disposed inside multi-function machine 10, separate from recording head 61. Each ink-supplying unit may contain ink of one of corresponding colors, e.g., cyan (C), magenta (M), yellow (Y), and black (Bk). Ink of each color may be supplied to recording head 61 through each of the corresponding one of ink tubes. Recording head 61 may selectively discharge ink drops while carriage 62 move over a recording medium. Thus, an image may be recorded on a sheet of recording medium fed over a platen 63.

A paper-feeding roller 29 and a pinch roller 30 may be disposed upstream from image-recording unit 24 and downstream from a second paper guiding member 41 in the sheet feeding direction. Pinch roller 30 may comprise a pair of rollers. Paper-feeding roller 29 and pinch roller 30 may pinch a sheet of recording medium fed in first paper feeding path 23 and may feed the sheet of recording medium onto platen 63. The driving force of a line feed ("LF") motor may be transmitted to paper-feeding roller 29 to drive paper-feeding roller 29 at a predetermined line feed width. Pinch roller 30 may be configured to movably engage and disengage paper-feeding roller 29. An elastic member, e.g., a coil spring, may urge pinch roller 30 to contact paper-feeding roller 29. When a sheet of recording medium is fed between paper-feeding roller 29 and pinch roller 30, pinch roller 30 may be slightly retracted by the thickness of the sheet of recording medium against the urging force applied by the elastic member. The retracted pinch roller 30 may apply pressure to the sheet of recording medium such that the sheet of recording medium is pressed against paper-feeding roller 29 when paper-feeding roller 29 and pinch roller 30 pinches the sheet of recording medium. As such, the rotational force of paper-feeding roller 29 efficiently may be transmitted to the sheet of recording medium. In another embodiment, a friction pad that is pressed against paper-feeding roller 29 may be used in place of pinch roller 30.

A paper ejection roller 31 and a spur 32 may be disposed downstream from image-recording unit 24 in the sheet feeding direction. Paper ejection roller 31 and spur 32 may pinch a sheet of recorded medium, on which image recording has been performed, and may feed the sheet of recorded medium onto paper ejection tray 21. The driving force of the LF motor may be communicated to paper-ejecting roller 31 to drive paper-ejecting roller 31 at a predetermined line feed width. Paper-feeding roller 29 may rotate in synchronization with the rotation of paper-ejecting roller 31. A rotary encoder (not shown) may be disposed on paper-feeding roller 29. An optical sensor may detect a disc pattern of the encoder, which rotates with paper-feeding roller 29. The LF motor may rotate according to a detection signal of the optical sensor.

As shown in FIG. 2, paper-feeding cassette 14 may be disposed under paper-feeding tray 20. Paper-feeding cassette 14 may have a shape of an open-top box. A plurality of sheets of recording medium may be stacked in paper-feeding cassette 14. An inclined paper separation plate 39 may be disposed at a downstream side of paper-feeding cassette 14 in the sheet feeding direction. Inclined paper separation plate 39 may feed the uppermost one of sheets of recording medium set in paper-feeding cassette 14 for separation. The uppermost sheet of recording medium may be separated from the other sheets of recording medium one at a time. As such, inclined paper separation plate 39 selectively may guide the uppermost sheet of recording medium upward in a successive manner.

Referring to FIG. 2, second paper feeding path 40 may extend from inclined paper separation plate 39 in an upward direction. Second paper feeding path 40 may be adjacent to first paper feeding path 23. Second paper feeding path 40 may be opposite to first paper feeding path 23 such that a surface of a sheet of recording medium fed in first paper feeding path 23 is parallel with a surface of a sheet of recording medium fed in second paper feeding path 40. Second paper feeding path 40 may extend from inclined paper separation plate 39 in an upward direction. Second paper feeding path 40 may comprise a curved portion disposed downstream from inclined paper separation plate 39 in the sheet-feeding direction. The curved portion may curve toward the front of multi-function machine 10. Second paper feeding path 40 and first paper feeding path 23 may merge at a point upstream from paper-feeding roller 29 in the sheet-feeding direction. First paper-guiding member 28 may form the outer sheet-guiding surface of first paper feeding path 23 and the inner sheet-guiding surface of second paper feeding path 40. The inner sheet-guiding surface of second paper feeding path 40 may correspond to the rear surface of first paper-guiding member 28.

Second paper-guiding member 41 may be disposed outside first paper-guiding member 28 with a predetermined clearance between first paper-guiding member 28 and second paper-guiding member 41. Second paper-guiding member 41 may form the outer sheet-guiding surface of second paper feeding path 40. First paper-guiding member 28 may be disposed between first paper feeding path 23 and second paper feeding path 40. A sheet of recording medium fed from paper-feeding cassette 14 may travel in second paper feeding path 40 upward and make a U-turn at the curved portion of second paper feeding path 40. Second paper feeding path 40 and first paper feeding path 23 may merge at a point upstream of paper-feeding roller 29 in the sheet-feeding direction. At image-recording unit 24, image recording may be performed on the sheet of recording medium. The recording medium may then be ejected to paper ejection tray 21.

Figure 3:
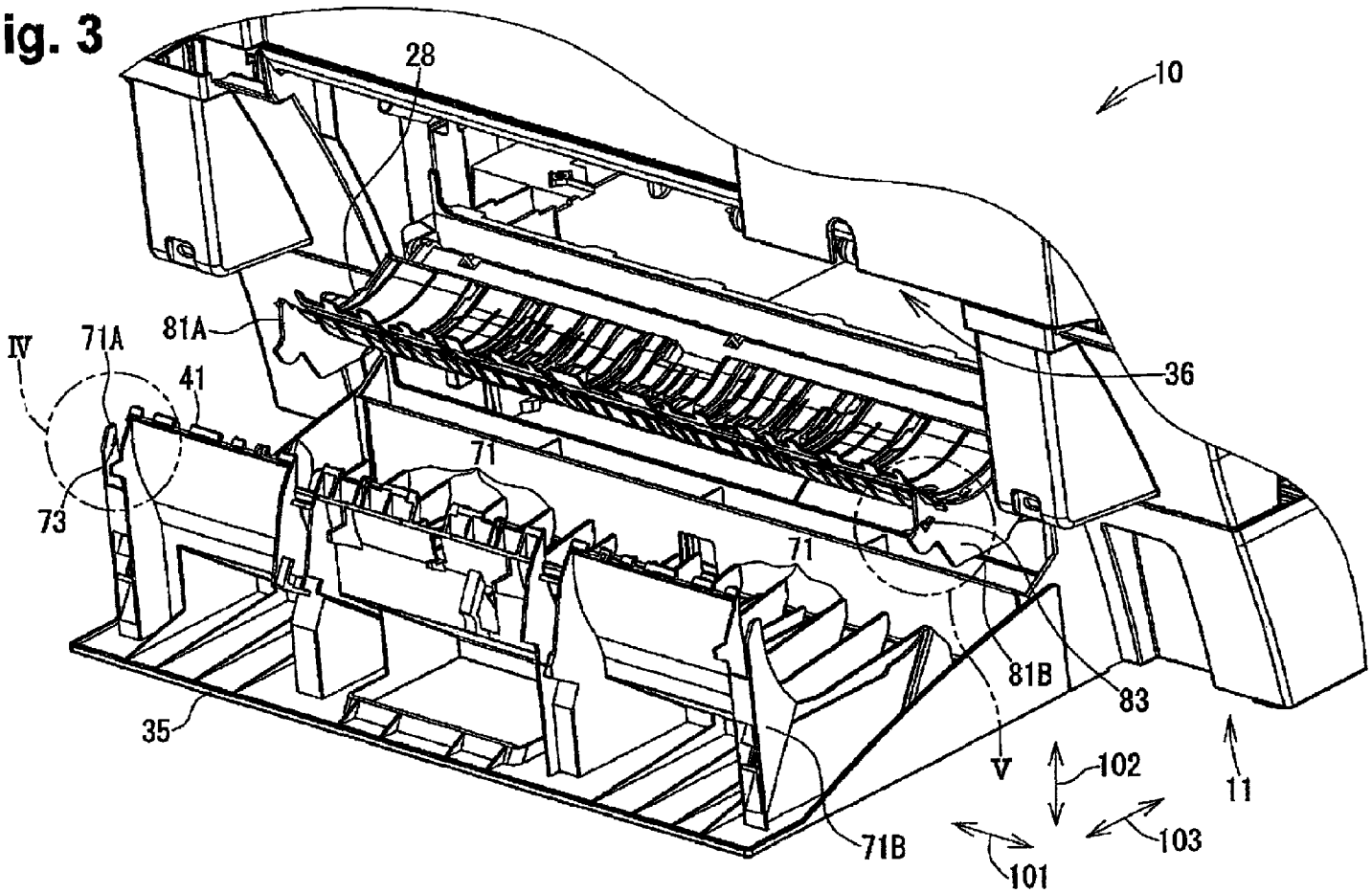
FIG. 3 is a perspective view of feeding paths in an open state where a first paper feeding path and a second paper feeding path are opened according to an embodiment of the invention.

As shown in FIGS. 2 and 3, second paper-guiding member 41 may be pivotably supported at the rear of printer unit 11 on the machine frame. Second paper-guiding member 41 may pivot between a third position and a fourth position. When second paper-guiding member 41 is in the third position, second paper feeding path 40 is closed such that second paper-guiding member 41 may guide a sheet of recording medium along second paper feeding path 40. The third position of second paper-guiding member 41 is indicated with solid lines in FIG. 2. When second paper-guiding member 41 is in the fourth position, second paper feeding path 40 is opened. The fourth position of second paper-guiding member 41 is indicated with broken lines in FIG. 2. As shown in FIG. 6, second paper-guiding member 41 may comprise a turn shaft 77 at its lower end. Turn shaft 77 of second paper-guiding member 41 may be pivotably attached to the machine frame. Second paper-guiding member 41 may pivot about turn shaft 77, which is the fulcrum, in the direction shown by a double-headed arrow 88.

An opening 36 may be formed at the rear part of printer unit 11. Opening 36 may be in communication with second paper feeding path 40. Second paper-guiding member 41 may cover opening 36 when it is in the third position, and may separate from opening 36 when it is in the fourth position. Second paper-guiding member 41 may comprise an engagement member (not shown). When opening 36 is covered, second paper-guiding member 41 may engage the frame of multi-function machine 10. The outer surface of second paper-guiding member 41 may comprise the rear cover surface of printer unit 11 when second paper-guiding member 41 is in the third position. When second paper-guiding member 41 pivots from the fourth position to the third position and first paper-guiding member 28 is in the second position, second paper-guiding member 41 may push first paper-guiding member 28 inward. As such, when second paper-guiding member 41 pivots from the fourth position to the third position, first paper-guiding member 28 also may pivot from the second position to the first position.

As shown in FIG. 2, a fulcrum of first paper-guiding member 28 may differ from a fulcrum of second paper-guiding member 41. Although turn shaft 87 of first paper-guiding member 28 is disposed in parallel with turn shaft 77 of second paper-guiding member 41, turn shaft 87 of the first paper-guiding member 28 may be disposed at a predetermined distance from turn shaft 77 of second paper-guiding member 41. Thus, a pivoting path of first paper-guiding member 28 may differ from a pivoting path of second paper-guiding member 41, as shown in FIGS. 6 and 7. A pivoting path is defined as the path that the center point of an object travels when the object pivots about a fulcrum.

A connecting member may comprise a projection 73 and an engagement member 83. Projection 73 may be disposed on second paper-guiding member 41 and engagement member 83 may be disposed on first paper-guiding member 28. Projection 73 and engagement member 83 may be engagement parts which may engage or disengage from each other. The state of the connecting member may be switched between a connected state, in which first paper-guiding member 28 and second paper-guiding member 41 are connected to each other, and a disconnected state, in which the connection of first paper-guiding member 28 and second paper-guiding member 41 is released. The connecting member may connect first paper-guiding member 28 with second paper-guiding member 41 when second paper-guiding member 41 is in the third position. The connecting member may maintain the connection of first paper-guiding member 28 and second paper-guiding member 41 when second paper-guiding member 41 is in the third position. When an external force with a magnitude greater than that of a connection-maintaining force required for maintaining the connection of first paper-guiding member 28 and second paper-guiding member 41 is applied in a direction of separating first paper-guiding member 28 and second paper-guiding member 41, the connecting member may release the connection of first paper-guiding member 28 and second paper-guiding member 41. The connection-maintaining force that is required for maintaining the connection of first paper-guiding member 28 and second paper-guiding member 41 may be a force of a predetermined magnitude.

A second paper-feeding roller 42 may be disposed over paper-feeding cassette 14 upstream from second paper-guiding member 41 in the sheet feeding direction. Second paper-feeding roller 42 may feed sheets of recording medium stacked on paper-feeding cassette 14 to second paper feeding path 40. Second paper-feeding roller 42 may be disposed at the front end of a second arm 43. Second arm 43 may rotatably support second paper-feeding roller 42. Driving power generated from a second driving source, e.g., an ASF motor, may be transmitted to second paper-feeding roller 42 via a driving force communication mechanism. The motor power communication mechanism may comprise a plurality of gears which engage one another. Second paper-feeding roller 42 may rotate by the motor power transmitted from the driving force communication mechanism.

Second arm 43 may be movably coupled to a supporting shaft 43A. As such, second arm 43 may move downward to approach the inner bottom face of the paper-feeding cassette 14. Second arm 43 may move up and away from paper-feeding cassette 14. An urging member, e.g., a mechanical spring or the like, may apply a downward urging force to second arm 43 to urge second arm 43 toward paper-feeding cassette 14. Moreover, second arm 43 may move toward paper-feeding cassette 14 due to its own weight. When paper-feeding cassette 14 is being inserted into or removed from printer unit 11, second arm 43 may be retracted upward and away from paper-feeding cassette 14. As second arm 43 is urged downward, second paper-feeding roller 42 that is supported at the front end of second arm 43 may contact the uppermost sheet of recording medium set in paper-feeding cassette 14, and second paper-feeding roller 42 may rotate. As a result of the rotation of second paper-feeding roller 42, the uppermost sheet of recording paper may be fed to inclined paper separation plate 39. The front edge of the uppermost sheet of recording medium may be brought into contact with inclined paper separation plate 39. Then, the sheet of recording medium may be guided upward to be fed to second paper feeding path 40.

As shown in FIG. 3, second paper-guiding member 41 may comprise an elongated curved shape. The long sides of second paper-guiding member 41 may extend in the width direction of second paper feeding path 40, as shown by arrow 101. Second paper-guiding member 41 may comprise a plurality of ribs 71. The plurality of ribs 71 may protrude from the inner surface of second paper-guiding member 41. When second paper-guiding member 41 is in the third position, the plurality of ribs 71 may extend toward first paper-guiding member 28. Ribs 71 may be arranged adjacent to one another in the width direction of second paper feeding path 40. Each of the plurality of ribs 71 may comprise a curved portion corresponding to the curved portion of second paper feeding path 40. Projection 73 may be disposed on each of ribs 71A and 71B respectively formed at each of the ends of second paper-guiding member 41 in the width direction. Right projection 73 of second paper-guiding member 41 is hidden by right rib 71B, and thus, is not shown in FIG. 3.

Figure 4:
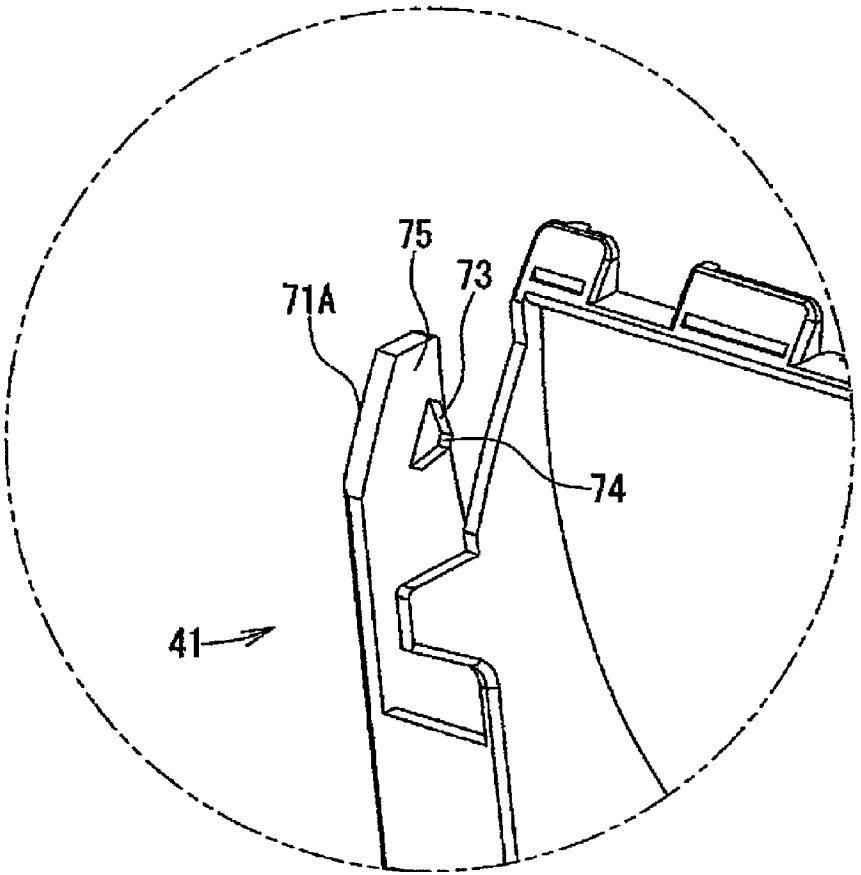
FIG. 4 is an enlarged view of a portion IV of the multi-function machine shown in FIG. 3.

FIG. 4 illustrates left projection 73 formed on left rib 71A. Projection 73 may be formed on an inner surface 75 of rib 71A. Projection 73 may comprise the shape of a triangle which protrudes in a direction perpendicular to inner surface 75 of rib 71A. Projection 73 may extend in a direction substantially orthogonal to second paper feeding path 40 when second paper-guiding member 41 is in the third position. Projection 73 may extend substantially in the height direction of multi-function machine 10, as shown by arrow 102, when second paper-guiding member 41 is in the fourth position. A right projection 73 with similar configuration as left projection 73 may be formed on an inner surface of the rib 71B.

As shown in FIG. 3, first paper-guiding member 28 may comprise an elongated curved shape. The long sides of first paper-guiding member 28 may extend in the width direction of second paper feeding path 40, as shown by arrow 101. First paper-guiding member 28 may comprise a curved portion corresponding to the curved portion of each of first paper feeding path 23 and second paper feeding path 40. Ribs 81A and 81B may be formed at each of the ends of first paper-guiding member 28 respectively in the width direction. Each of ribs 81A and 81B may extend toward second paper-guiding member 41 from the corresponding end of first paper-guiding member 28. Ribs 81A and 81B may determine the width of second paper feeding path 40 formed between first paper-guiding member 28 and second paper-guiding member 41. Engagement member 83 may be disposed on each of ribs 81A and 81B. Left engagement member is hidden by left rib 81A, as viewed in the width direction of first paper-guiding member 28, and thus, is not shown in FIG. 3.

Figure 5:
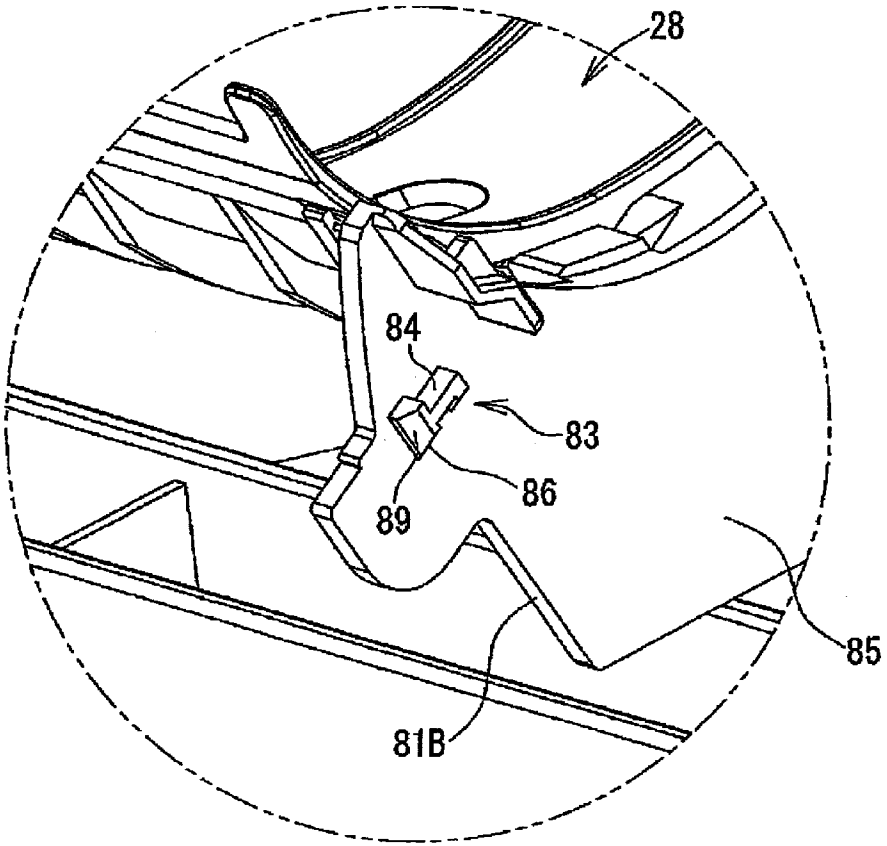
FIG. 5 is an enlarged view of a portion V of the multi-function machine shown in FIG. 3.

FIG. 5 illustrates right engagement member 83 formed on right rib 81B. Engagement member 83 may be formed on an outer surface 85 of rib 81B, and may protrude in a direction perpendicular to outer surface 85 of rib 81B. Engagement member 83 may have a position or a shape, or both, which enable engagement member 83 to be engaged with projection 73 when second paper-guiding member 41 is in the third position, and first paper-guiding member 28 is in the first position, as shown by the solid lines in FIG. 2. Engagement member 83 may comprise a body part 84 and a head part 86. Body part 84 of engagement member 83 may extend substantially in the direction of the height of multi-function machine 10, as shown by arrow 102, when first paper-guiding member 28 is in the first position. When first paper-guiding member 28 is in the second position, body part 84 of engagement member 83 may extend in a direction substantially orthogonal to first paper feeding path 23. Head part 86 of engagement member 83 may be disposed adjacent to one end of body part 84, and disposed at the upper-end side of body part 84 when first paper-guiding member 28 is in the first position. A width of head part 86 of engagement member 83 may be larger than a width of body part 84. A tapered plane 89 may be formed as a part of head part 86. An engagement member having similar configuration as engagement member 83 may be formed on an outer surface of rib 81A.

Figure 6A:
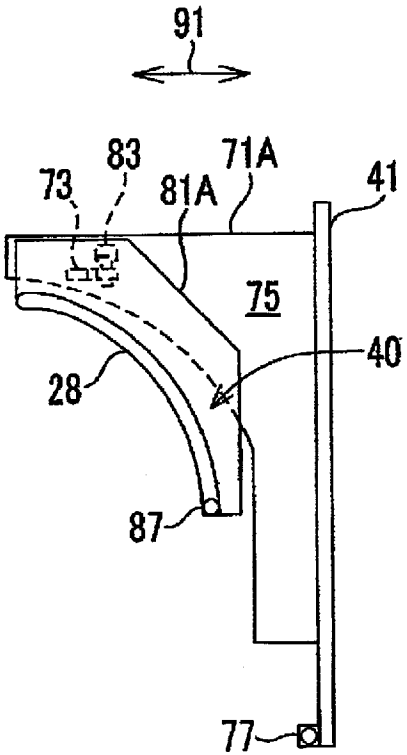
FIG. 6A is a schematic showing a connection operation of a projection and a engagement member in paper-absent state.
Figure 6B:
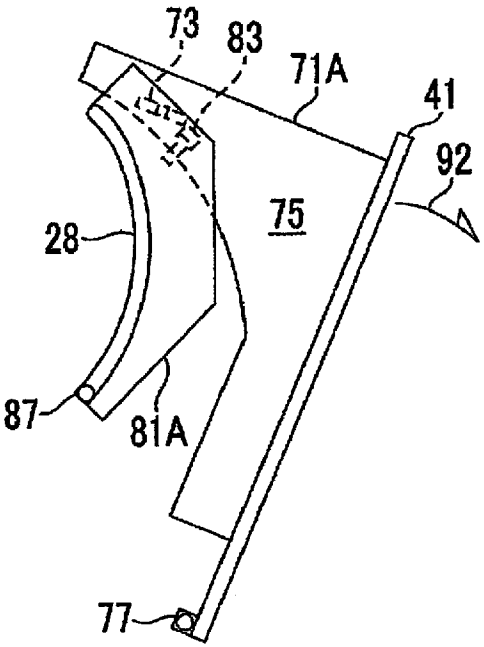
FIG. 6B is another schematic showing the connection operation of the projection and the engagement member in paper-absent state.
Figure 6C:
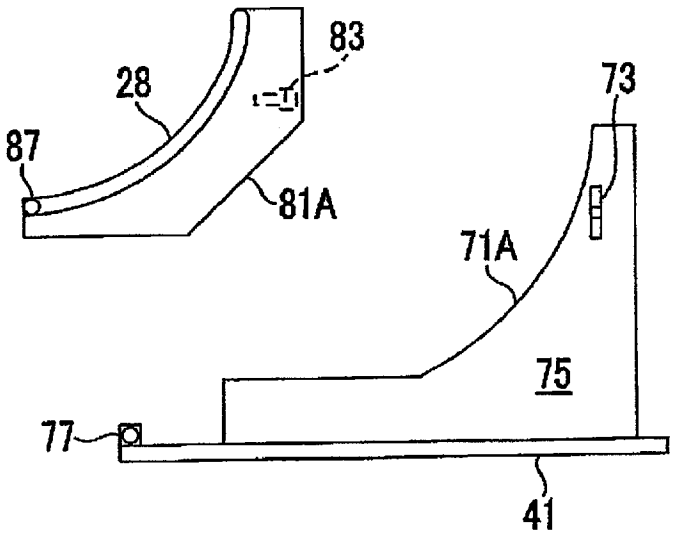
FIG. 6C is yet another schematic showing the connection operation of the projection and the engagement member in paper-absent state.
Figure 7B:
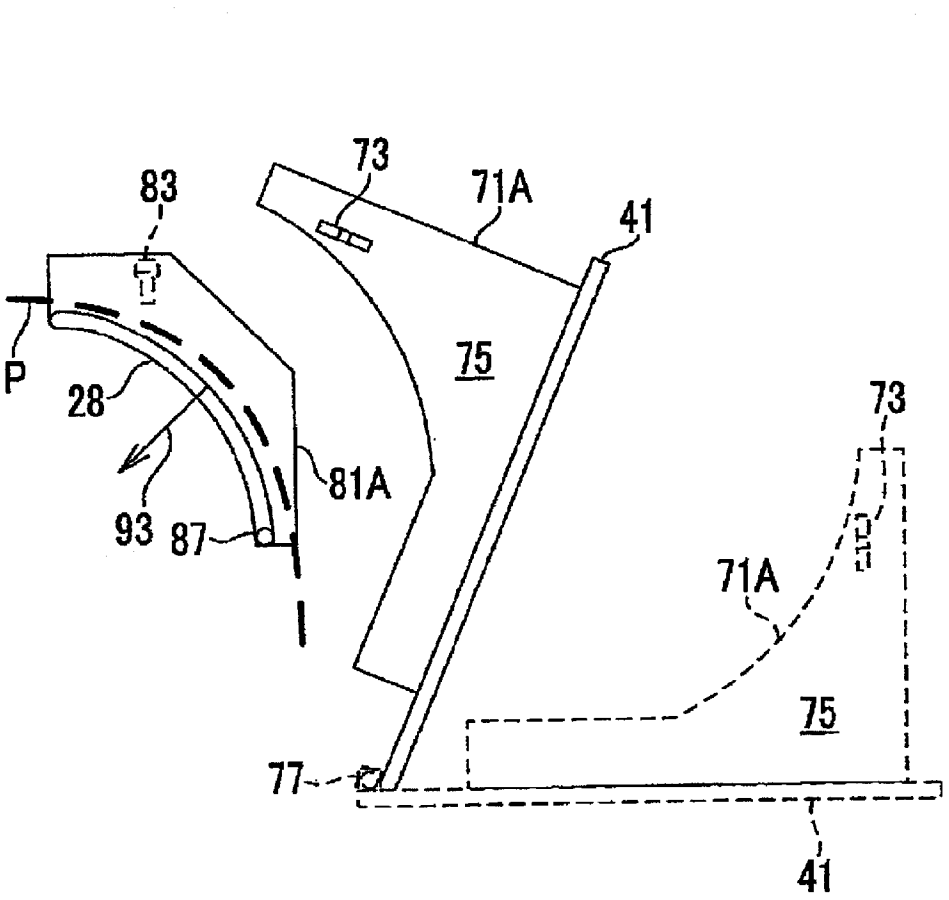
FIG. 7B is another schematic showing a connection operation of a projection and a engagement member in paper-present state.
Figure 7A:
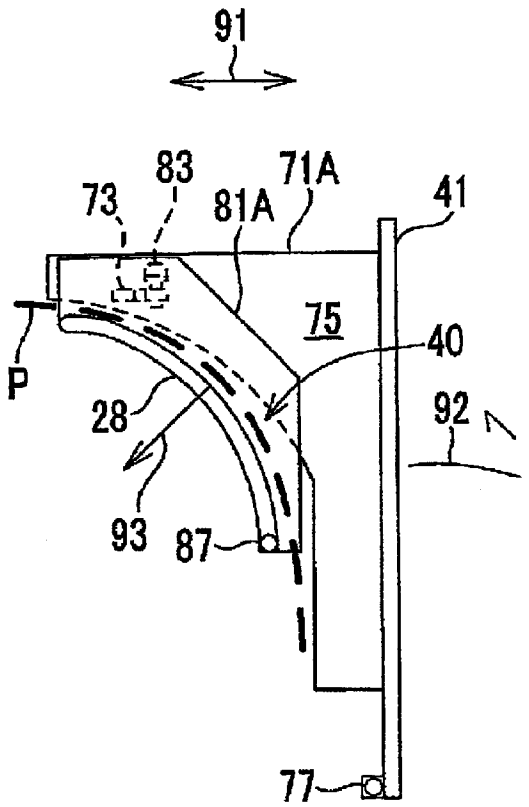
FIG. 7A is a schematic showing the connection operation of the projection and the engagement member in paper-present state.

FIGS. 6 and 7 show connection and disconnection operations of first paper-guiding member 28 and second paper-guiding member 41 according to an embodiment of the invention. FIGS. 6A, 6B, and 6C illustrate the connection and the release of the connection of first paper-guiding member 28 and second paper-guiding member 41 without the presence of a sheet of recording paper P in second paper feeding path 40, according to an embodiment of the invention. FIGS. 7A and 7B illustrate the connection and the release of the connection of first paper-guiding member 28 and second paper-guiding member 41 when there is a sheet of recording paper P present in second paper feeding path 40, according to an embodiment of the invention.

FIG. 6A illustrates a state in which first paper-guiding member 28 is in the first position and second paper-guiding member 41 is in the third position. As shown in FIG. 6A, each of first paper feeding path 23 and second paper feeding path 40 may be configured as a paper conveyance passage through which a sheet of recording medium may be fed. When first paper-guiding member 28 is in the first position and second paper-guiding member 41 is in the third position, a portion of rib 71A or 71B may overlap a portion of rib 81A or 81B, respectively, such that inner surface 75 of rib 71A or 71B and outer surface 85 of rib 81A or 81B respectively face each other. As such, projection 73 may engage engagement member 83. An apex portion 74 of projection 73 may engage body part 84 of engagement member 83 in the connection process and may be fitted into body part 84 of engagement member 83 in the connected state. Thus, projection 73 and engagement member 83 may engage each other with an engagement force in the direction shown by an arrow 91.

Second paper-guiding member 41 may pivot about turn shaft 77 in a direction shown by an arrow 91. Since projection 73 and engagement member 83 are engaged, first paper-guiding member 28 also may pivot about turn shaft 77 in the direction shown by arrow 92. Consequently, first paper-guiding member 28 may start to pivot about shaft 87. In the pivoting process, projection 73 and engagement member 83 gradually may separate from each other in the vertical direction, as shown by arrow 102, because a pivoting radius of first paper-guiding member 28 is smaller than a pivoting radius of second paper-guiding member 41, and further because a pivoting path of first paper-guiding member 28 is different from a pivoting path of second paper-guiding member 41. A pivoting radius is defined as the distance between a fulcrum to an end of an pivoting object opposite the fulcrum.

When first paper-guiding member 28 pivots to a particular point in the direction shown by arrow 92, engagement member 83 and projection 73 may disengage from each other in the vertical direction, as shown by arrow 102. Thus, the connection of first paper-guiding member 28 and second paper-guiding member 41 may be released. First paper-guiding member 28 may transition into the second position and second paper-guiding member 41 may transition into the fourth position. As such, by opening second paper-guiding member 41, both first paper feeding path 23 and second paper feeding path 40 may be opened substantially at the same time. Therefore, for example, when a paper jam occurs in first paper feeding path 23, a user easily may remove the sheet of jammed recording paper in the first paper feeding path 23.

FIG. 7A illustrates a positional state in which first paper-guiding member 28 is in the first position and second paper-guiding member 41 is in the third position. Projection 73 and engagement member 83 are in engagement with each other with an engagement force in the direction, as shown by arrow 91. A paper feeding operation may be stopped due to a sheet of recording paper P jammed in second paper feeding path 40. The front edge of the sheet of jammed recording paper P may be pinched between paper-feeding roller 29 and pinch roller 30 and the rear edge of the sheet of jammed recording paper P may be held by second paper-feeding roller 42.

As shown in FIG. 7A, second paper-guiding member 41 may pivot about turn shaft 77 in a direction shown by arrow 91. Since projection 73 and engagement member 83 are engaged, an engagement force may be exerted on first paper-guiding member 28 in the direction of arrow 92. The sheet of jammed recording paper P in second paper feeding path 40 may apply a pressing force, which may be applied in a direction shown by arrow 93, to first paper-guiding member 28. In an embodiment of the invention, the pressing force may be a tensile force on the jammed sheet of recording paper P, whose front edge may be pinched between paper-feeding roller 29 and pinch roller 30 and whose rear edge may be held by second paper-feeding roller 42. In another embodiment of the invention, the pressing force may be due to the stiffness of the jammed sheet of recording paper P. The engagement force, which maintains projection 73 and engagement member 83 in engagement with each other and which works in the direction shown by arrow 91, may be smaller in magnitude than the pressing force. As such, when second paper-guiding member 41 is drawn in the direction shown by arrow 92, apex part 74 of projection 73 may separate from body part 84. Consequently, projection 73 and engagement member 83 may disengage from each other. Thus, when second paper-guiding member 41 pivots about turn shaft 77, first paper-guiding member 28 may remain at the first position, as shown in FIG. 7B. Therefore, when there is a sheet of jammed recording paper P in second paper feeding path 40, only second paper feeding path 40 may be opened when second paper-guiding member 41 pivots from the third position to the fourth position. Accordingly, when a paper jam occurs in second paper feeding path 40, a user easily may remove the sheet of jammed recording paper P from second paper feeding path 40.

Figure 8B:
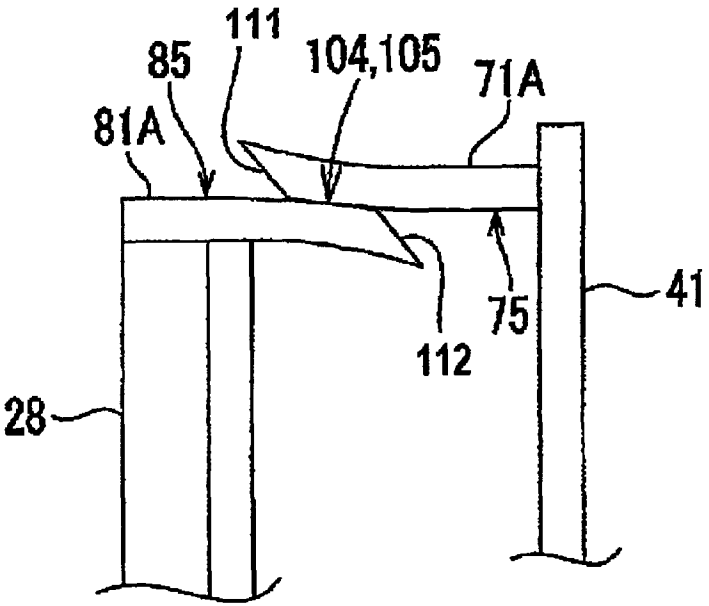
FIG. 8B is a schematic view of the operation of an embodiment of the invention.
Figure 8A:
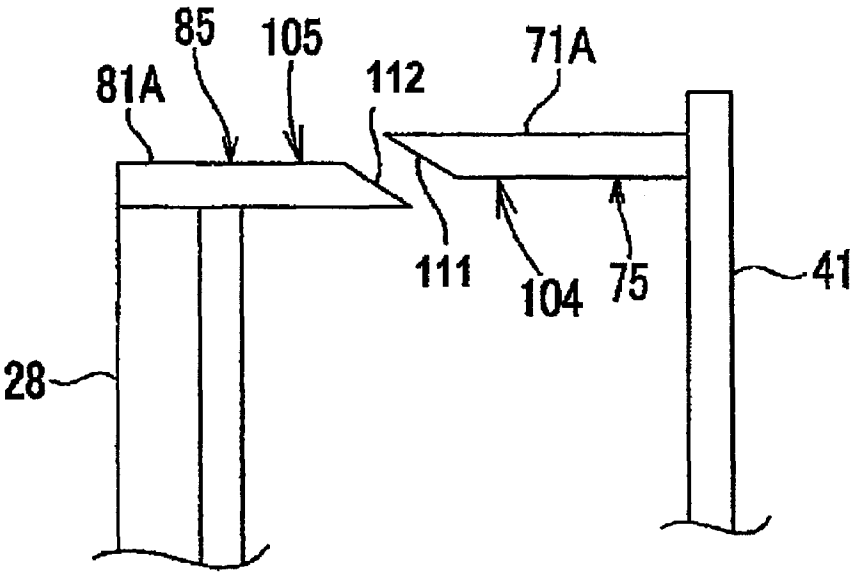
FIG. 8A is a schematic view of the operation of an embodiment of the invention.

In another embodiment of the invention, the connection member may comprise rib 81A of first paper-guiding member 28 and rib 71A of second paper-guiding member 41. As shown in FIGS. 8A and 8B, rib 81A and rib 71A may be configured to engage when first paper-guiding member 28 and second paper-guiding member 41 are in the first position and the third position, respectively. Rib 81A of first paper-guiding member 28 and rib 71A of second paper-guiding member 41 may bend slightly such that outer surface 85 of rib 81A may contact inner surface 75 of rib 71A. A connection force may be created by the friction between outer surface 85 of rib 81A and inner surface 75 of rib 71A to maintain connection between first paper-guiding member 28 and second paper-guiding member 41.

When second paper-guiding member 41 pivots open, first paper-guiding member 28 also may pivot open due to the connection force. When second paper feeding path 40 contains a sheet of jammed recording medium, the connection of rib 81A of first paper-guiding member 28 and rib 71A of second paper-guiding member 41 may be released, such that the opening of second paper-guiding member 41 does not open first paper-guiding member 28.

Rib 81A may comprise a slanted surface 112 inclined in an angle at its front end. The front end of Rib 71A may comprise a slanted surface 111 inclined in another angle corresponding to the angle of slanted surface 112. Slanted surface 112 of rib 81A and slanted surface 111 of rib 71A may slide against each other for a smooth connection. A friction member with a predetermined friction coefficient may be disposed on one or both of a contact surface 105 of rib 81A and a contact surface 104 of rib 71A. The predetermined friction coefficient may correspond to the magnitude of the connection force and may ensure good connection between rib 81A rib 71A.

In yet another embodiment of the invention, the connection member may comprise a magnet member. For example, a magnet may be disposed on inner surface 75 of rib 71A and another magnet may be disposed on outer surface 85 of rib 81A. As such, first paper-guiding member 28 and second paper-guiding member 41 may be connected to each other by magnetic attraction.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A sheet feeding device comprising:

a first sheet feeding path and a second sheet feeding path through which a sheet is configured to be fed;

a first sheet-guiding member disposed between the first sheet feeding path and the second sheet feeding path, wherein the first sheet-guiding member is configured to move between a first position and a second position, wherein when the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side;

a second sheet-guiding member disposed opposite the first sheet feeding path, wherein the second sheet-guiding member is configured to move between a third position and a fourth position, wherein when the second sheet-guiding member is in the third position, the second sheet-guiding member guides the sheet along the second sheet feeding path, and when the second sheet-guiding member is in the fourth position, the second sheet-guiding member is separated from the second sheet feeding path; and a connecting member configured to selectively couple the first sheet-guiding member to the second sheet-guiding member, wherein when the first sheet-guiding member is coupled to the second sheet-guiding member, the first sheet-guiding member is configured to move from the first position to the second position when the second sheet-guiding member moves from the third position to the fourth position,

*wherein when the sheet is in the second sheet feeding path, the sheet prevents the first sheet-guiding member from moving, and wherein when the second sheet-guiding member moves from the third position to the fourth position, the first sheet-guiding member remains in the first position*.

2. The sheet feeding device according to claim 1, wherein the connecting member is configured to allow the first sheet-guiding member and the second sheet-guiding member to be separated when a force equal to or greater than a predetermined force is applied to the connecting member, and the connecting member is configured to maintain the first sheet-guiding member coupled to the second sheet-guiding member when a force less than the predetermined force is applied to the connecting member.

3. The sheet feeding device of claim 2, wherein the force equal to or greater than the predetermined force is applied in a direction which increases a separation of the first sheet-guiding member from the second sheet-guiding member.

4. The sheet feeding device according to claim 1, wherein when the sheet is in the second sheet feeding path, the sheet prevents the first sheet-guiding member from moving, and wherein when the second sheet-guiding member moves from the third position to the fourth position, the first sheet-guiding member remains in the first position.

5. The sheet feeding device according to claim 1, further comprising a sheet-feeding section disposed downstream of the second sheet-guiding member in a sheet feeding direction, wherein the sheet-feeding section is configured to feed and hold the sheet in the second sheet feeding path.

6. The sheet feeding device according to claim 1, wherein the second sheet-guiding member covers an opening formed through a wall of a body of the sheet feeding device when the second sheet-guiding member is in the third position, and the second sheet-guiding member is separated from the opening when the second sheet-guiding member is in the fourth position.

7. The sheet feeding device according to claim 1, wherein each of the first sheet-guiding member and the second sheet-guiding member is pivotably mounted on a body of the sheet feeding device.

8. The sheet feeding device according to claim 7, wherein a fulcrum of the first sheet-guiding member is different from a fulcrum of the second sheet-guiding member, and when the second sheet-guiding member moves from the third position to the fourth position, the second sheet-guiding member disconnects from the first sheet-guiding member at a predetermined position.

9. A sheet feeding device comprising:

a first sheet feeding path and a second sheet feeding path through which a sheet is configured to be fed;

a first sheet-guiding member disposed between the first sheet feeding path and the second sheet feeding path, wherein the first sheet-guiding member is configured to move between a first position and a second position, wherein when the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side;

a second sheet-guiding member disposed opposite the first sheet feeding path, wherein the second sheet-guiding member is configured to move between a third position and a fourth position, wherein when the second sheet-guiding member is in the third position, the second sheet-guiding member guides the sheet along the second sheet feeding path, and when the second sheet-guiding member is in the fourth position, the second sheet-guiding member is separated from the second sheet feeding path;

a connecting member configured to selectively couple the first sheet-guiding member to the second sheet-guiding member;

a first rib which is disposed on the first sheet-guiding member and extends toward the second sheet-guiding member; and a second rib which is disposed on the second sheet-guiding member and extends toward the first sheet-guiding member, wherein the connecting member is disposed on each of the first rib and the second rib,

*wherein a first portion of at least one of a connection surface of the first rib and a connection surface of the second rib comprises a friction member having a first friction coefficient which is greater than a second friction coefficient of a second portion of at least one of a connection surface of the first rib and a connection surface of the second rib.*

[10. The sheet feeding device according to claim 9, wherein the connecting member comprises:

a first projection disposed on a first end of the second sheet-guiding member in a width direction;

a second projection disposed on a second end of the second sheet-guiding member in a width direction;

a first engagement member disposed on a first end of the first sheet-guiding member in a width direction;

a second engagement member disposed on a second end of the first sheet-guiding member in a width direction and wherein the first engagement member is configured to engage with the first projection and the second engagement member is configured to engage with the second projection.]

[11. The sheet feeding device according to claim 9, wherein a first portion of at least one of a connection surface of the first rib and a connection surface of the second rib comprises a friction member having a first friction coefficient which is greater than a second friction coefficient of a second portion of at least one of a connection surface of the first rib and a connection surface of the second rib.]

[12. The sheet feeding device according to claim 9, wherein the connecting member comprises a magnet configured to attract the first sheet-guiding member toward the second sheet-guiding member.]

[13. An image recording apparatus comprising a sheet feeding device, the sheet feeding device comprises:

a first sheet feeding path and a second sheet feeding path through which a sheet is configured to be fed;

a first sheet-guiding member disposed between the first sheet feeding path and the second sheet feeding path, wherein the first sheet-guiding member is configured to move between a first position and a second position, wherein when the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side;

a second sheet-guiding member disposed opposite the first sheet feeding path, wherein the second sheet-guiding member is configured to move between a third position and a fourth position, wherein when the second sheet-guiding member is in the third position, the second sheet-guiding member guides the sheet along the second sheet feeding path, and when the second sheet-guiding member is in the fourth position, the second sheet-guiding member is separated from the second sheet feeding path; and a connecting member configured to selectively couple the first sheet-guiding member to the second sheet-guiding member, wherein when the first sheet-guiding member is coupled to the second sheet-guiding member, the first sheet-guiding member is configured to move from the first position to the second position when the second sheet-guiding member moves from the third position to the fourth position.]

*14. A sheet feeding device comprising:*

*a first sheet feeding path and a second sheet feeding path through which a sheet is configured to be fed;*

*a first sheet-guiding member disposed between the first sheet feeding path and the second sheet feeding path, wherein the first sheet-guiding member is configured to move between a first position and a second position, wherein when the first sheet-guiding member is in the first position, the first sheet-guiding member guides the sheet along at least one of the first sheet feeding path and the second sheet feeding path, and when the first sheet-guiding member is in the second position, the first sheet-guiding member is separated from the first sheet feeding path on a second-sheet-feeding-path side;*

*a second sheet-guiding member disposed opposite the first sheet feeding path with respect to the first sheet-guiding member, wherein the second sheet-guiding member is configured to move between a third position and a fourth position, wherein when the second sheet-guiding member is in the third position, the second sheet-guiding member guides the sheet along the second sheet feeding path, and when the second sheet-guiding member is in the fourth position, the second sheet-guiding member is separated from the first sheet-guiding member; and*

*a connecting member configured to selectively couple the first sheet-guiding member to the second sheet-guiding member, wherein when the first sheet-guiding member is coupled to the second sheet-guiding member, the first sheet-guiding member is configured to move from the first position to the second position when the second sheet-guiding member moves from the third position to the fourth position, the connecting member comprising an elastically-deforming portion configured to be elastically deformed, the elastically-deforming portion being deformed while the first sheet-guiding member is coupled to the second sheet-guiding member via the connecting member.*

*15. The sheet feeding device according to claim 14, wherein elastically-deformation of the elastically-deforming portion is reduced when the second sheet-guiding member reaches a predetermined position.*

*16. The sheet feeding device according to claim 15, wherein when the elastically-deformation of the elastically-deforming portion is reduced, the second sheet-guiding member disconnects from the first sheet-guiding member.*

*17. The sheet feeding device according to claim 14, wherein the connecting member comprises a first contacting portion and a second contacting portion which are configured to contact each other, and the first contacting portion is configured to be separated from the second contacting portion when the second sheet-guiding member reaches a predetermined position.*

*18. The sheet feeding device according to claim 17, wherein when the first contacting portion is separated from the second contacting portion, elastically-deformation of the elastically-deforming portion is reduced.*

*19. The sheet feeding device according to claim 14, wherein when the elastically-deforming portion is plate-shaped.*

*20. The sheet feeding device according to claim 14, wherein the connecting member is configured to allow the first sheet-guiding member and the second sheet-guiding member to be separated when a force equal to or greater than a predetermined force is applied to the connecting member, and the connecting member is configured to maintain the first sheet-guiding member coupled to the second sheet-guiding member when a force less than the predetermined force is applied to the connecting member.*

*21. The sheet feeding device of claim 20, wherein the force equal to or greater than the predetermined force is applied in a direction which increases a separation of the first sheet-guiding member from the second sheet-guiding member.*

*22. The sheet feeding device according to claim 14, further comprising a sheet-feeding section disposed downstream of the second sheet-guiding member in a sheet feeding direction, wherein the sheet-feeding section is configured to feed and hold the sheet in the second sheet feeding path.*

*23. The sheet feeding device according to claim 14, wherein the second sheet-guiding member covers an opening formed through a wall of a body of the sheet feeding device when the second sheet-guiding member is in the third position, and the second sheet-guiding member is separated from the opening when the second sheet-guiding member is in the fourth position.*

*24. The sheet feeding device according to claim 14, wherein each of the first sheet-guiding member and the second sheet-guiding member is pivotably mounted on a body of the sheet feeding device.*

*25. The sheet feeding device according to claim 24, wherein a fulcrum of the first sheet-guiding member is different from a fulcrum of the second sheet-guiding member, and when the second sheet-guiding member moves from the third position to the fourth position, the second sheet-guiding member disconnects from the first sheet-guiding member at a predetermined position.*

*26. The sheet feeding device according to claim 24, wherein a fulcrum of the first sheet-guiding member and a fulcrum of the second sheet-guiding member differ in height.*

* * * * *